(12) United States Patent
Birkbeck

(10) Patent No.: US 7,351,331 B2
(45) Date of Patent: Apr. 1, 2008

(54) RECREATIONAL SPA INCLUDING A BROMINE GENERATOR

(75) Inventor: Paul Birkbeck, Lakewood, CO (US)

(73) Assignee: Pioneer H20 Technologies, Inc., Lakewood, CO (US)

( * ) Notice: Subject to any disclaimer, the term of this patent is extended or adjusted under 35 U.S.C. 154(b) by 306 days.

(21) Appl. No.: 10/935,304

(22) Filed: Sep. 8, 2004

(65) Prior Publication Data

US 2006/0049115 A1    Mar. 9, 2006

(51) Int. Cl.
*C02F 1/76* (2006.01)
(52) U.S. Cl. .............................. 210/167.11; 210/198.1; 210/192; 204/276; 204/294
(58) Field of Classification Search ........... 210/167.11, 210/192, 198.1, 196, 416.2; 204/275.1, 276, 204/294
See application file for complete search history.

(56) References Cited

U.S. PATENT DOCUMENTS

| | | | | |
|---|---|---|---|---|
| 4,085,028 A | * | 4/1978 | McCallum | .................. 204/269 |
| 4,330,387 A | * | 5/1982 | Astruc et al. | ............. 204/275.1 |
| 5,254,226 A | * | 10/1993 | Williams et al. | ............. 205/335 |
| 5,460,702 A | | 10/1995 | Birkbeck et al. | |
| 6,391,167 B1 | | 5/2002 | Grannersberger | |
| 2004/0168909 A1 | * | 9/2004 | Larson | ....................... 204/233 |

OTHER PUBLICATIONS

YBD Anode Grades technical information sheet (1 page); UCAR Carbon Company, Inc., Clarksburg, WV.
Autoclor & Econoclor report (7 pages); Sunshine Pool Products, Clearfield, UT.
GENESIS Automatic Bromine Generators brochure; Pioneer H2O Technologies, Inc.; Lakewood, Colorado.
The Super Nog information sheet; website information.
Automatic Chlorine Generators article (5 pages); Pool & Spa Marketing, Fall 1996 NSPI Show Issue.

* cited by examiner

*Primary Examiner*—Matthew O. Savage
(74) *Attorney, Agent, or Firm*—Berenato, White & Stavish

(57) ABSTRACT

A bromine generator apparatus is provided for producing bromine from a bromide salt. The apparatus includes an electrical power unit, a housing, and first and second electrodes. The housing has inlet and outlet openings constructed and arranged for permitting the passage of water containing a bromide salt into the housing and water containing bromine out of the housing, respectively. The first and second electrodes electrically are connectable to the electrical power unit and have first and second contact regions, respectively, in the housing for contacting water passing through the housing and converting the bromine salt to the corresponding free bromine. The first and/or second contact regions are made of non-woven extruded graphite.

30 Claims, 3 Drawing Sheets

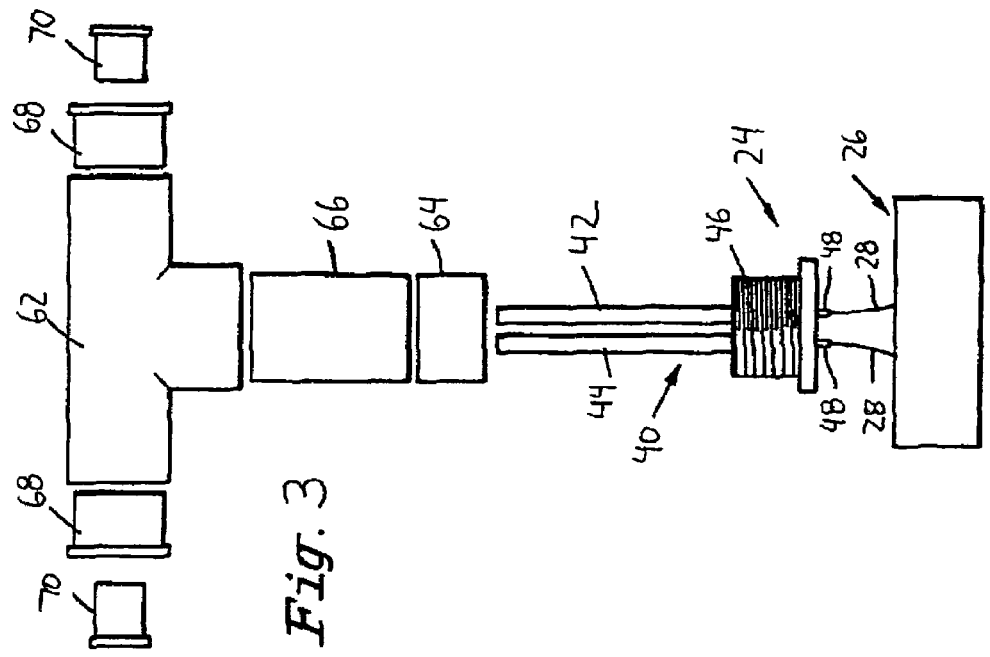
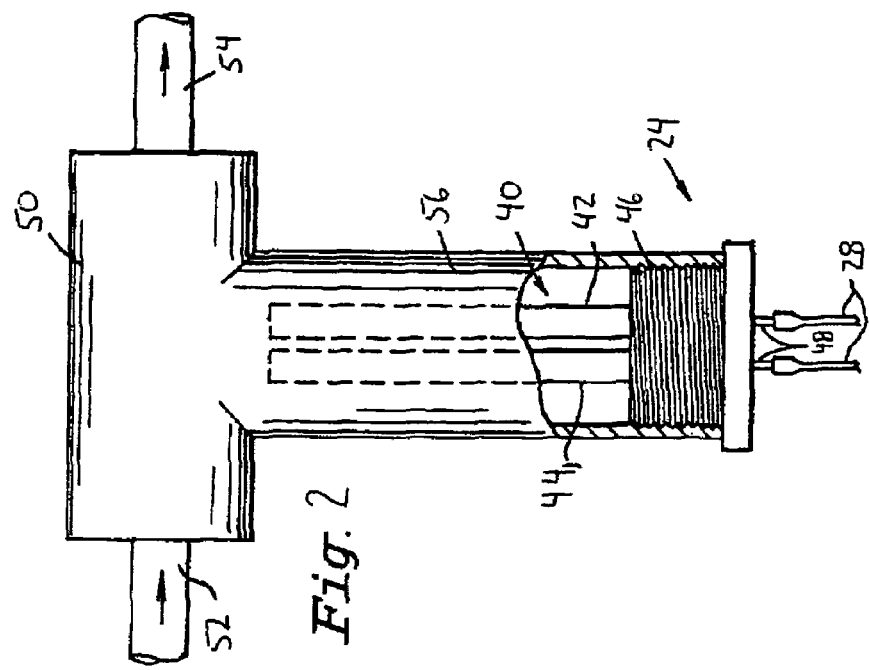

RECREATIONAL SPA INCLUDING A BROMINE GENERATOR

BACKGROUND OF THE INVENTION

1. Field of the Invention

The invention relates to a bromine generating apparatus sanitation of hot tubs, spas and swim spas. The invention also is related to systems containing a bromine generating apparatus, and methods of treating water, especially in recreational water reservoirs having recirculating systems.

2. Description of the Related Art

Recreational water reservoirs such as hot tubs, spas, and swim spas (hereinafter collectively referred to as "recreational spa water reservoirs") are breeding grounds for algae, bacteria and other microorganisms. If left untreated, water-borne bacteria can afflict users of the recreational spa water reservoirs with a variety of health problems and illnesses, such as pseudomonas, rashes, hot tub lung, ear infections, etc.

Water sanitation is well known and long practiced. Sanitation regimens and processes rely on standard halogen treatment chemicals to provide disinfecting action. Halogens, and in particular free chlorine and bromine, long have been the chemicals of choice for treating recreational reservoir water. During the past 20 years, chlorine and bromine have proved to be useful and cost effective for ensuring proper sanitation of pools and spas.

Conventional halogen sanitation regimens and processes for recreational spa water reservoirs make use of tablets, liquids and powders that rely on a strict and continual maintenance regimen in order to function properly. Deviation due to forgetfulness or negligence can lower the availability of sanitizing halogen in the water reservoir and, as a consequence, compromise the fitness of the water. It is not uncommon, for example, for a spa (hot tub) owner to remove a floating apparatus containing brominating tablets from a spa prior to use, and then forget to return the apparatus to the spa after use. A day or more of missed sanitizing treatment can be sufficient to permit proliferation of microorganisms in the spa. Microorganism build-up in the water eventually affects water clarity. However, microorganism levels can reach a harmful level before becoming visually detectable. In the event that a spa user decides the visual water clarity to be acceptable and enters the spa, the user may unsuspectingly be exposed to harmful levels of organisms.

Another drawback to conventional halogen tablets and some other solids is that the tablets are prone to disintegration upon extended use, resulting in the buildup of total dissolved solids (TDS) in the water reservoir. TDS can generate large amounts of foam in water, requiring the user to treat the water with chemicals such as de-foamers and de-scummers and to routinely drain the water.

More recently, it has been known to equip swimming pools with "automatic" chlorine generator cells. These automatic cells usually cooperate with an already existing re-circulation system, such as a water filtration system comprising piping and a water pump. Ordinary salt, such as sodium chloride, is added to the water reservoir to form a dissolved electrolyte in the water. The water carries the electrolyte through the piping and, consequently, through the cell installed in the re-circulation system. Electrodes in the cell cause the salt to undergo electrolysis, which breaks the salt down into its basic elements, e.g., sodium and chlorine. The re-circulation system returns the water to the water reservoir with an enhanced chlorine level to provide sanitation and disinfecting action against bacteria, viruses, and algae. In doing so, the chlorine reverts back into its dissolved salt state for recycling and further use. This cycle is repeated multiple times.

Known chlorinator cells work to the extent that they satisfactorily treat water. However, known cells have drawbacks. These metallic cells, and in particular the electrodes of these cells, have a limited lifespan and are thus both inconvenient and expensive to maintain in full working order. Degraded electrodes can deleteriously affect performance if not timely replaced.

SUMMARY OF THE INVENTION

Accordingly, it is an object of the invention to provide a bromine generating apparatus and related water treatment systems and methods that comprise at least one and preferably two electrodes having extended durability.

It is another object of the invention to provide a bromine generator apparatus and related water treatment systems and methods that are acceptable for use in recreational hot tubs, spas, and water spas (hereinafter collectively "recreational spas").

Yet another object of the invention is to provide a bromine generator apparatus and related water treatment systems and methods that significantly lessen or eliminate problems such as destruction and corrosion of recreational spa equipment.

Still a further object of the invention is to provide a bromine generator apparatus and related water treatment systems and methods that can be easily adopted into the filter lines of existing automatic recirculating water systems for automated operation.

To achieve one or more of the foregoing objects, and in accordance with the purposes of the invention as embodied and broadly described herein, according to a first aspect of this invention there is provided a recreational portable spa, comprising a recreational spa water reservoir containing a bromide salt dissolved in water, an electrical power unit, and a recirculating system for removing and returning the water from and to the recreational spa water reservoir, the recirculating system comprising a circulation pump, a passageway, and a filter. The recreational portable spa further comprises a bromine generator apparatus comprising a housing and first and second electrodes. The housing comprises inlet and outlet openings operatively associated with the passageway for permitting the passage of water containing the bromide salt into the housing and water containing free bromine out of the housing, respectively. The first and second electrodes are electrically connected to the electrical power unit and have first and second contact regions, respectively, in the housing for contacting water passing through the housing and converting the bromide salt to the free bromine. The first and/or second contact regions are made of graphite.

In accordance with a second aspect of the invention, a method is provided for treating recreational spas with bromine using the water treatment system of the first aspect of the invention. According to this aspect of the invention, bromide salt-containing water is passed into the housing through the inlet opening, where free bromine is generated at one of the electrodes. The water containing the free bromine is discharged from the housing through the outlet opening and returned to the recreational spa water reservoir.

To achieve one or more of the foregoing objects, and in accordance with the purposes of the invention as embodied and broadly described herein, according to a third aspect of this invention there is provided a bromine generator apparatus for producing free bromine from bromine salt. The bromine generator apparatus of this aspect of the invention comprises an electrical power unit, a housing, and first and second electrodes. The housing comprises inlet and outlet openings constructed and arranged for permitting the passage of water containing a bromide salt into the housing and water containing free bromine out of the housing, respectively. The first and second electrodes are electrically connectable to the electrical power unit and have first and second contact regions, respectively, in the housing for contacting water passing through the housing and converting the bromide salt to free bromine. The first and second contact regions each are made of non-woven extruded graphite.

According to a fourth aspect of the invention, a method is provided for treating water with free bromine using the bromine generator apparatus of the third aspect of the invention. According to this aspect of the invention, bromide salt-containing water is passed into the housing through the inlet opening, where free bromine is generated at one of the electrodes. The water containing the free bromine is discharged with water from the housing through the outlet opening.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 2 is a partial cut-away, partial phantom sectional view of a bromine generator apparatus according to an embodiment of the invention, said apparatus being installable into the system of FIG. 1;

FIG. 3 is an exploded schematic view of an alternative bromine generator apparatus according to another embodiment of the invention, the apparatus being installable into the system of FIG. 1.

DETAILED DESCRIPTION OF THE PREFERRED EMBODIMENTS AND METHODS OF THE INVENTION

Figure 1:
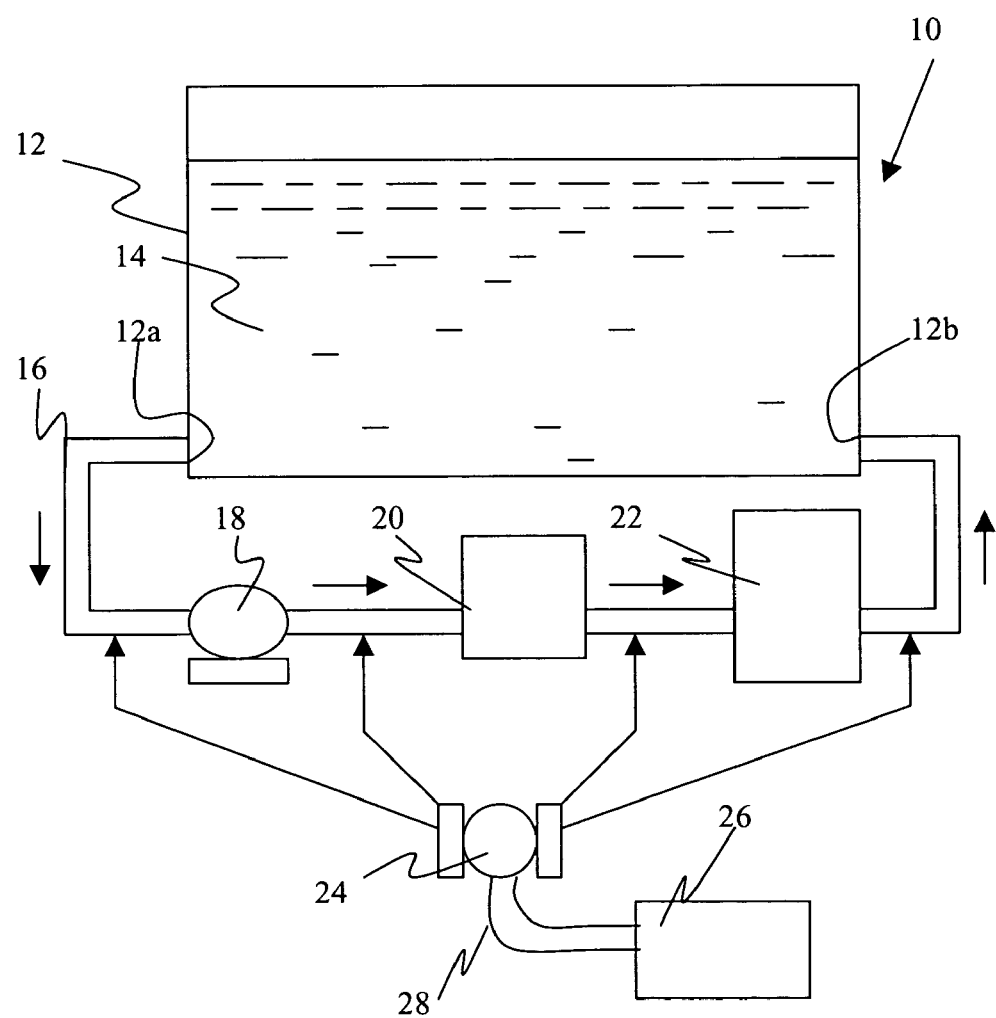
FIG. 1 is a schematic view of a water treatment system equipped with a bromine generator apparatus according to an embodiment of the invention.

Reference will now be made in detail to the presently preferred embodiments and embodied methods of the invention as illustrated in the accompanying drawings, in which like reference characters designate like or corresponding parts throughout the drawings. It should be noted, however, that the invention in its broader aspects is not limited to the specific details, representative apparatuses and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Referring now more particularly to the drawings, a water treatment system 10 for the purification of water in accordance with an embodiment of the invention is illustrated. The system 10 comprises a body of water 14 disposed in a water reservoir 12. According to a preferred embodiment, the water reservoir 12 comprises a recreational, portable spa (or hot tub or water spa) having a capacity less than 1000 gallons, typically about 150 gallons to about 700 gallons of water. The terms spa and hot tub are used interchangeably herein.

It is to be understood that the water reservoir 12 may comprise recreational bodies other than spa water reservoirs 12, such as and especially including swimming pools. The water reservoir 12 is preferably but not necessarily a man-made stationary or movable vessel. It also should be understood that various aspects and embodiments of the invention may have wider applicability, such as to purification or sanitization of other bodies of water, air conditioning and cooling towers, industrial waste, other industrial uses.

The water treatment system 10 is particularly preferred for use in connection with a reservoir 12 having one or more pre-existing recirculation systems. For example, in the illustrated embodiment, which is especially suited for use in a spa, the recirculation system comprises a flow conduit (e.g., piping or passageway) 14 communicating at its opposite ends with an inlet 12a and outlet 12b of the water reservoir 12. The pre-existing circulation system of the illustrated embodiment further comprises a pump 18 and a filter 20 (preferably a mechanical filter) situated along flow conduit 14. In certain systems, such as for a hot tub, the recirculation system may further comprise a heater 22 for heating water 14 in the reservoir 12 to a selected temperature and maintaining the temperature.

In FIG. 1, reference numeral 24 represents the bromine generator apparatus according to an embodiment of the invention. The bromine generator apparatus 24 is, in use, preferably connected in series to a filtration recirculation system so that filtered (or pre-filtered) water will pass through the apparatus 24 before returning to the reservoir 12 through outlet 12b. For example, the bromine generator apparatus 24 may be situated before (upstream from) the pump 18, between the pump 18 and the filter 20, between the filter 20 and the heater 22, or after (downstream from) the heater 22. Optionally, a plurality of bromine generator apparatuses 24 may be placed in line at different locations along the recirculation system. In the event that the system 10 comprises a plurality of recirculation systems, a respective bromine generator apparatus 24 may be installed in line with each of the recirculation systems.

Figure 4:
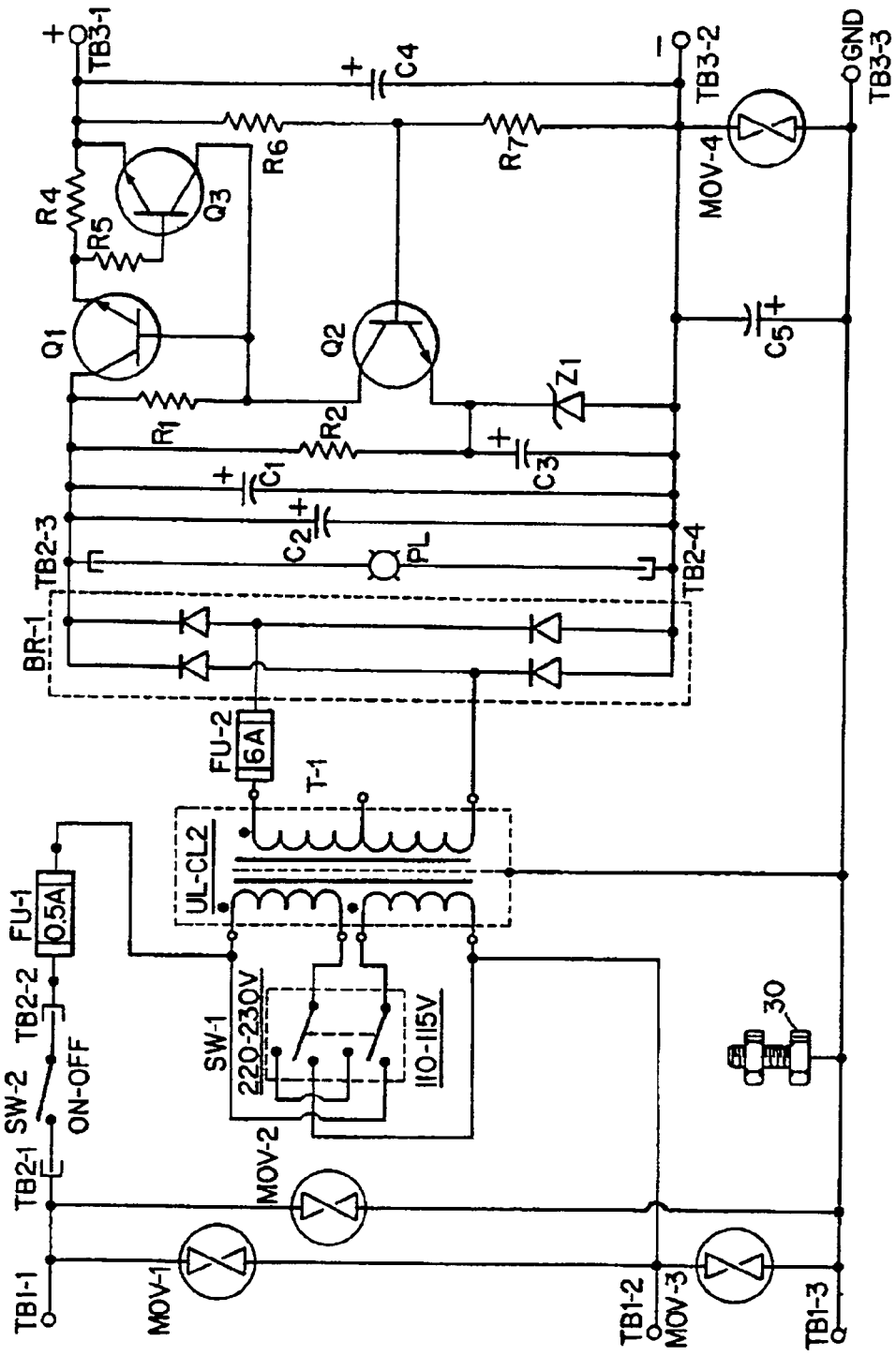
FIG. 4 is a circuit diagram of a suitable AC to DC power supply that may be used to stimulate the electrodes of the present invention.

Electrical connectors 28, e.g., wires, electrically connect the bromine generator apparatus 24 to a power unit 26. The power unit 26 can be of any known or useful design that is capable of receiving either a standard household 110 or 220 volt alternating current (AC) source and is capable of converting the AC power source to direct current (DC) power. The power unit 26 may comprise an AC to DC rectifier and controller for converting the normal household current to the required direct current (DC) output. The power unit 26 is preferably capable of supplying a nominal charge of about 650 millivolts DC at about 100 to 500 milliamps, more preferably about 250 to 350 milliamps to an electrode assembly 40 (discussed below) through the connectors 28. A schematic circuit diagram of a suitable AC to DC power supply is illustrated at FIG. 4. It should be noted that this particular power supply 12 has numerous grounding features, as illustrated in FIG. 4, to provide an increased level of safety during operation. The power unit 26 is preferably digital in design, i.e., operates under digital (duty cycle) control.

The system may further comprise a timer (not shown) employed with a polarity reversal circuit to periodically change the anode and cathode potential to prevent scale buildup on the electrode surfaces. The polarity is preferably changed every 3 to 8 minutes, more preferably every 4 minutes of operation.

The electrode assembly 40 of the illustrated embodiment comprises a pair of electrodes 42 and 44 in spaced parallel relationship with each other. An end cap 46 secures one end of each of the electrodes 42 and 44 in this manner. The electrodes 42 and 44 are fitted into the inner diameter of the cap 46 and are cemented using a non-conductive epoxy. Any of the numerous commercially available epoxies that are also not chemically reactive or water soluble can be used for this purpose.

The end cap 46 permits easy installation and removal of the electrode assembly 40 into and from existing filter lines or water recirculation systems. The cap 46 can be constructed of various materials, but is preferably made of ABS, PVC or stainless steel and is likewise preferably threaded so as to provide assistance in securing it to recirculation systems or filter lines as illustrated in FIG. 2.

The electrodes 42 and 44 are furthermore each tapped and fitted with a respective stainless steel threaded bolt 48. As previously indicated, the electrodes 42 and 44 are provided with low voltage DC current from power unit 26 through the connectors 28 and bolts 48. The bolts 48 protrude through the cap 46 so that an electrical contact from the power supply 26 may be made through connectors 28.

The electrodes 42 and 44 of this embodiment of the present invention are rather important and unique in their construction. The length, width and thickness of the electrodes 42 and 44 may vary with the number of gallons of water to be purified in a given application. A preferable electrode configuration is illustrated in FIGS. 2 and 3. As an example, electrodes that measure 8" in length, 1" in width and have a thickness of approximately 0.5" (inch) have been found particularly preferable for use in connection with the purification of small bodies of water (between 1,000 and 50,000 gallons).

At least one of the electrodes 42 and 44, and preferably both of the electrodes 42 and 44, have contact regions constructed of graphite, preferably non-woven extruded carbon graphite that is highly conductive, but significantly and more preferably totally non-reactive when operated under normal parameters. As referred to herein, an electrode "contact region" may comprise a portion (i.e., less than all of the electrode) or the entire electrode. The contact region preferably consists essentially of, and optionally consists of graphite.

The non-woven extruded carbon graphite preferably has a permeability equal to or less of 0.14 darcy's and a porosity equal to or less than 21%. More preferably, the non-woven extruded carbon graphite has a permeability equal to or than 0.01 darcy's and a porosity equal to or less than 15%. Still more preferably, the non-woven extruded graphite has a permeability equal to or less than 0.005 darcy's and a porosity equal to or less than 13%. Non-woven extruded graphite materials having low permeabilities and porosities generally are much more durable and long lasting in an electrically active aqueous environment that other materials previously used for such purposes, such as compressed carbon composite and platinum coated metals. Without wishing to be bound by any theory, water absorption by the carbon graphite substrate generally increases with porosity. The application of an electrical current to a highly porous electrode can cause the liberation of a relatively large amount of hydrogen and oxygen gases in the pores. The gases generally expand and, as the gases attempt to escape the porous structure, can degrade the electrode.

Another preferred yet optional characteristic of the non-woven extruded carbon graphite is a relatively low ash content. Preferably, the ash content is not greater than about 5 weight percent, more preferably not greater than about 1 weight percent, still more preferably not greater than 0.5 weight percent, and most preferably less than 0.2 weight percent. Again without wishing to be bound by theory, higher ash contents can adversely affect conductivity and lead to erosion of the electrode, thereby shortening the electrode lifespan.

Examples of useful electrodes materials are listed in Table 1 below, and include grades YBD, YBDX, YBDXX, YBDXX 88, and YBDXX 158, each of which is commercially available from UCAR Carbon Company, Inc. of Clarksburg, W. Va.

TABLE 1

|  | YBD | YBDX | YBDXX | YBDXX88 | YBDXX158 |
|---|---|---|---|---|---|
| Bulk Density (g/cm$^3$) | 1.50 | 1.57 | 1.65 | 1.68 | 1.73 |
| Particle Size (max.in) | 0.03 | 0.03 | 0.03 | 0.03 | 0.03 |
| Flexural Strength (psi) | 2600 | 3300 | 3400 | 3500 | 4100 |
| Young's Modulus (10$^6$) | 2.0 | 2.1 | 2.1 | 2.2 | 2.4 |
| Tensile Strength (psi) | 2000 | 2100 | 2200 | 2500 | 3400 |
| Compressive Strength (psi) | 6600 | 10400 | 15800 | 18000 | 22500 |
| Permeability (darcy's) | 0.14 | 0.01 | 0.005 | 0.006 | 0.0 |
| Porosity (%) | 21 | 15 | 13 | 10 | 5 |
| Hardness (Rockwell) | 78 "L" | 91 "L" | 90 "L" | 110 "L" | 121 "L" |
| C.T.E. (10$^{-6}$/° C.) |  | 2.5 | 3.7 | 3.8 | 5.1 |
| Thermal | 7* | 7 | 4.1 | 4 | 4 |

TABLE 1-continued

| | YBD | YBDX | YBDXX | YBDXX88 | YBDXX158 |
|---|---|---|---|---|---|
| Conductivity (W/mK) | | | | | |
| Ash (%) | 0.2 | 0.2 | * | * | * |

\* = Estimate;
All properties measured "with grain".

Of these, YBDXX 88 and YBDXX 158 are impregnated (or "doped") with a phenolic resin, which increases the resistivity of the materials. The selected non-woven extruded graphite of embodiments of this invention preferably yet optionally is substantially free of impregnated resins, or at least are doped with a sufficiently small amount of resin so as not to lower conductivity below operable levels. The aqueous specific surface resistivity of the electrodes is preferably equal to or less than $10^{-2}$ (0.01) ohms/cm$^2$, more preferably equal to or less than $10^{-3}$ (0.001) ohms/cm$^2$. The aqueous specific resistivity may be higher; higher resistivities may be accounted for by use of enhanced electrolyte concentrations, greater available applied voltages, and/or closer electrode spacing.

Properties such as bulk density, particle size, strength (flexural, tensile, and compressive), Young's Modulus, and hardness are not particularly limited, other than being adequate for the intended purpose of the invention. Suitable but not necessarily limiting ranges for each of these properties may be deduced from the exemplary graphitic materials reported in the above Table 1.

In operation the apparatus 24 essentially functions as an electrolytic device (or electrochemical cell) which uses a source of electric potential to pass electric current through two electrodes immersed in a solution of salt. Electrode assembly 40 is first inserted into a contact chamber of housing 50. The electrode assembly 40 can be secured to the housing 50 by cementing the cap 46 to portion of the inner surface of the housing 50 and/or by providing a threaded outer surface on the cap 46 that engages a threaded surface inside of the housing 50. The housing 50 is installed in the return line of a water flow or recirculation system. The electrode assembly 40 is connected to the power supply 26 as previously described in detail.

Water 14 from the water reservoir 12 circulating through the recirculating system is supplied to the contact chamber of the housing 50 by the water supply line 52, which is coupled to (or constituted by) the flow conduit 16. The water flowing into the housing 50 comes into contact with the electrode assembly 40 for bromine enrichment. The water supply line 52 is smaller in diameter than the contact chamber in order to slow down the flow of water through the housing 50 and promote a longer contact time of the water with the electrode assembly 40. Accordingly, it is preferred that the water supply line 52 be on the order of 1 ½" to 2" in diameter, while the contact chamber is 2" to 4" in diameter. It should be understood that these dimensions may vary in accordance with the present invention, depending upon the flow rate and type of water purification to be achieved, as well as the size of the reservoir 12 and the apparatus 24.

The "T-shaped" geometry of the contact chamber with its vertical chamber 56 is preferred yet optional, and serves to promote a longer contact time between water and the electrodes 42 and 44. With the electrodes 42 and 44 placed in a vertical chamber 56 of the housing 50, low voltage DC current is passed between the electrodes 42 and 44. The electrolyte comprises a bromide salt, such as NaBr (sodium bromide) dissolved in water. Bromide ions in the water coming into contact with one of the electrodes 42 or 44 operating as the anode, i.e., positive charged electrode, are converted into corresponding free available bromine. The chemistry is as follows:

Cathode: $2Na^+ + 2e^- \rightarrow 2Na$
Anode: 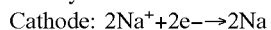
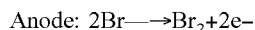
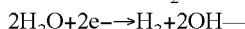
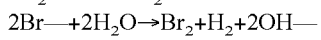

Electronic control of the power unit 26 increases or decreases the power to the electrodes for the purpose of increasing or decreasing bromine production. Other parameters affecting bromine production include electrolyte concentration and spacing of the electrodes from one another. For example, the water 14 in the reservoir 12 has a suitable electrolyte salt content in order for the electrolysis to take place to release sufficient free available bromine into the flowing water to provide adequate purification. The electrolyte salt concentration may be selected, for example, in a range of 1,500 to 2,500 ppm (parts per million).

Outflow liquid 14 from the device and having an enhanced free bromine level dissolved therein is directed back to the reservoir 12 through line 54, which is likewise of smaller diameter than the housing 50 in order to promote longer contact time of the water in the chamber with the electrodes 42 and 44. The bromine content of the water 14 in the reservoir 12 is thereby increased to provide a sanitizing and disinfecting action. In this manner, the discussed embodiment of the present invention provides for the sanitization of water in a recirculation system that utilizes standard household current and requires only a low voltage DC current to be converted from the alternating current power supply. The free bromine produced when consumed during sanitation reverts back to its salt counterpart and the cycle repeats.

Referring now to FIG. 3, utilization of device 24 is illustrated in connection with a standard tee type fitting 60 found in many existing recirculating water lines. Device 24, operating in the same manner as described in detail above, can be connected to such a tee fitting 62 with the use of an adaptor 64 and pipe 66 made preferably of PVC or a similar material. In addition, restrictions on the water flow both into and out of the tee fitting 62 can be accomplished by the use of one or more reducers, such as reducers 68 and 70.

The apparatus 24 may be operated on any time schedule sufficient for maintaining the water 14 in the reservoir 12 sanitized. The operation schedule will depend upon various factors, including the size of the water reservoir, environment conditions, personal preference, etc. According to one preferred yet optional embodiment, water is circulated through the circulating system and the apparatus for at least 6 to 12 hours per day, typically as dictated by a timer associated with the pump 18. The timer optionally may be controlled to split the operational period into multiple shifts spaced uniformly or non-uniformly throughout the course of day. The unit 26 is electrically connected to the load side of the circulating pump 18 to operate in synchronicity with the pump.

The proper operation of the apparatus 24 may be tested with a bromine test strip or a standard liquid reagent that will show the actual bromine level in the reservoir's water.

Operation of the apparatus 24 and system 10 of embodiments of the present invention may provide various advantages. For example, routine and consistent use of the apparatus 24 in accordance with the above-prescribed schedule can substantially reduce or eliminate the need to use chemicals and to drain the reservoir 14 of water 12 due to poor water clarity or other problems discussed above. Another advantage is that the generated bromine is converted back into it counterpart salt after performing its sanitizing function, thereby reducing or eliminating the need to introduce new salt into the system. Additionally, preferred embodiments of the present invention advantageously allowed for prolonged operation of the electrode assembly 40 without replacement of either of the electrodes 42 and 44. According to preferred embodiments, in accelerated testing it has been estimated that the electrode assembly 40 may be operated as described above for 5 years or longer, preferably at least 7 years, without requiring replacement.

The following experiments are presented by way of example, and are not necessarily limiting on or exhaustive of the scope of the invention.

Experiments

Tests were performed in an exhaust fume hood at 22° C. and ambient pressure. Initially 2.0 liters of ASTM Type II water were placed in a vessel and stirred. To this solution, 4.4 grams of Genesis Tru-Blu reagent (NaBr) were added to reach the desired concentration of 2200 mg/L NaBr. After the reagent dissolved, this concentration was verified in duplicate using Environmental Test Systems Inc. sodium bromide test strips (Lot #3721211). This analysis was performed at both a 1× and 2× dilution.

Following the initial preparation of the solution, a bromine generator of Pioneer H2O Technologies, Inc. of Lakewood, Colo. was placed in the vessel and the system was allowed to equilibrate with the power off for five minutes. After equilibrium, the absence of free bromine was verified using both the calorimetric and test strip methods. The bromine generator was turned on at a power setting of 10 for the first group of tests (Table 2), and sample aliquots for bromine analysis were taken at 1-minute intervals. This procedure was then repeated using a power setting of 2 on the bromine generator for the second group of tests (Table 3). Bromine levels exceeding the limit of the calorimeter analysis were determined using the test strip method.

TABLE 2

| Minute | Test Strip Concentration | Colorimetric Confirmation |
|---|---|---|
| 0 | <3 mg/L | <0.4 mg/L |
| 1 | 6 mg/L | Over Range |
| 2 | 10 mg/L | Over Range |
| 3 | 20 mg/L | Over Range |

TABLE 3

| Minute | Test Strip Concentration | Colorimetric Confirmation |
|---|---|---|
| 0 | <3 mg/L | <0.4 mg/L |
| 1 | <3 mg/L | 2.41 mg/L |
| 2 | 3 mg/L | 3.891 mg/L |
| 3 | 6 mg/L | Over Range |
| 4 | 6 mg/L | Over Range |
| 5 | 6 mg/L | Over Range |
| 6 | 10 mg/L | Over Range |
| 7 | 10 mg/L | Over Range |
| 10 | 10 mg/L | Over Range |
| 15 | 20 mg/L | Over Range |

The bench scale results were extrapolated as follows. At a power setting of 10, after three minutes (0.05 hours) the solution contained 20 mg/L of bromine in 2.0 liters, constituting 40 mg of total bromine formed in 0.5 hours. This is equivalent to 800 mg bromine per hour, and 19.2 grams bromine per day.

At a power setting of 2, after 15 minutes (about 0.3 hours) the solution contained 20 mg/L of bromine in 2.0 liters, constituting 40 mg of total bromine formed in about 0.3 hours. This is equivalent to 133 mg bromine per hour, and 3.19 grams bromine per day.

Further extrapolating this data, at a power setting of 10:
300 gallons (1136 L): 19200 mg/1136 L=16.9 mg/L=16.9 ppm $Br_2$/day
400 gallons (1514 L): 19200 mg/1514 L=12.7 mg/L=12.7 ppm $Br_2$/day
500 gallons (1892 L): 19200 mg/1892 L=10.1 mg/L=10.1 ppm $Br_2$/day Extrapolating the data at a power setting of 2 results as follows:
300 gallons (1136 L): 3190 mg/1136 L=2.8 mg/L=2.8 ppm $Br_2$/day
400 gallons (1514 L): 3190 mg/1514 L=2.1 mg/L=2.1 ppm $Br_2$/day
500 gallons (1892 L): 3190 mg/1892 L=1.6 mg/L=1.6 ppm $Br_2$/day The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A recreational portable spa, comprising:
a recreational spa water reservoir for containing a bromide salt dissolved in water;
a recirculating system for removing and returning the water from and to the spa water reservoir, the recirculating system comprising a circulation pump, a passageway, and a filter;
an electrical power unit;
a housing comprising inlet and outlet openings operatively associated with the passageway for permitting the passage of water containing the bromide salt into the housing and water containing free bromine out of the housing, respectively; and
first and second electrodes electrically connected to the electrical power unit and having first and second contact regions, respectively, in the housing for contacting water passing through the housing and converting the bromide salt to the free bromine, at least one of the first and second contact regions being made of non-woven extruded graphite having a permeability equal to or less than 0.14 darcy's and a porosity equal to or less than 21%.

2. A recreational portable spa according to claim 1, wherein the non-woven extruded graphite has an ash content equal to or less than 1.0 weight percent.

3. A recreational portable spa according to claim 1, wherein the non-woven extruded graphite has an ash content equal to or less than 0.5 weight percent.

4. A recreational portable spa according to claim 1, wherein the non-woven extruded graphite has an aqueous specific resistivity equal to or less than 0.01 ohms/cm$^2$.

5. A recreational portable spa according to claim 1, wherein the non-woven extruded graphite has aqueous specific resistivity equal to or less than 0.001 ohms/cm$^2$.

6. A recreational portable spa according to claim 1, wherein the electrical power unit permits switching polarity between the first and second electrodes.

7. A recreational portable spa according to claim 1, wherein the spa has a capacity of from about 150 to about 700 gallons.

8. A recreational portable spa according to claim 1, wherein the first and second contact regions are each made of the non-woven extruded graphite.

9. A recreational portable spa according to claim 1, wherein the non-woven extruded graphite has an ash content equal to or less than 0.2 weight percent.

10. A recreational portable spa according to claim 1, wherein:
the non-woven extruded graphite has an ash content equal to or less than 1.0 weight percent; and an aqueous specific resistivity equal to or less than 0.01 ohms/cm$^2$; and
the spa has a capacity of from about 150 to about 700 gallons.

11. A recreational portable spa, comprising:
a recreational spa water reservoir for containing a bromide salt dissolved in water;
a recirculating system for removing and returning the water from and to the spa water reservoir, the recirculating system comprising a circulation pump, a passageway, a filter;
an electrical power unit;
a housing comprising inlet and outlet openings operatively associated with the passageway for permitting the passage of water containing the bromide salt into the housing and water containing free bromine out of the housing, respectively; and
first and second electrodes electrically connected to the electrical power unit and having first and second contact regions, respectively, in the housing for contacting water passing through the housing and converting the bromide salt to the free bromine, at least one of the first and second contact regions being made of non-woven extruded graphite having a permeability equal to or than 0.01 darcy's and a porosity equal to or less than 15%.

12. A recreational portable spa according to claim 11, wherein the non-woven extruded graphite has an ash content equal to or less than 1.0 weight percent.

13. A recreational portable spa according to claim 11, wherein the non-woven extruded graphite has an ash content equal to or less than 0.5 weight percent.

14. A recreational portable spa according to claim 11, wherein the non-woven extruded graphite has an ash content equal to or less than 0.2 weight percent.

15. A recreational portable spa according to claim 11, wherein the non-woven extruded graphite has an aqueous specific resistivity equal to or less than 0.01 ohms/cm$^2$.

16. A recreational portable spa according to claim 11, wherein the non-woven extruded graphite has aqueous specific resistivity equal to or less than 0.001 ohms/cm$^2$.

17. A recreational portable spa according to claim 11, wherein the electrical power unit permits switching polarity between the first and second electrodes.

18. A recreational portable spa according to claim 11, wherein the spa has a capacity of from about 150 to about 700 gallons.

19. A recreational portable spa according to claim 11, wherein the first and second contact regions are each made of graphite.

20. A recreational portable spa according to claim 11, wherein:
the non-woven extruded graphite has an ash content equal to or less than 1.0 weight percent; and an aqueous specific resistivity equal to or less than 0.01 ohms/cm$^2$; and
the spa has a capacity of from about 150 to about 700 gallons.

21. A recreational portable spa, comprising:
a recreational spa water reservoir for containing a bromide salt dissolved in water;
a recirculating system for removing and returning the water from and to the spa water reservoir, the recirculating system comprising a circulation pump, a passageway, a filter;
an electrical power unit;
a housing comprising inlet and outlet openings operatively associated with the passageway for permitting the passage of water containing the bromide salt into the housing and water containing free bromine out of the housing, respectively; and
first and second electrodes electrically connected to the electrical power unit and having first and second contact regions, respectively, in the housing for contacting water passing through the housing and converting the bromide salt to the free bromine, at least one of the first and second contact regions being made of non-woven extruded graphite having a permeability equal to or less than 0.005 darcy's and a porosity equal to or less than 13%.

22. A recreational portable spa according to claim 21, wherein the non-woven extruded graphite has an ash content equal to or less than 1.0 weight percent.

23. A recreational portable spa according to claim 21, wherein the non-woven extruded graphite has an ash content equal to or less than 0.5 weight percent.

24. A recreational portable spa according to claim 21, wherein the non-woven extruded graphite has an ash content equal to or less than 0.2 weight percent.

25. A recreational portable spa according to claim 21, wherein the non-woven extruded graphite has an aqueous specific resistivity equal to or less than 0.01 ohms/cm$^2$.

26. A recreational portable spa according to claim 21, wherein the non-woven extruded graphite has aqueous specific resistivity equal to or less than 0.001 ohms/cm$^2$.

27. A recreational portable spa according to claim 21, wherein the electrical power unit permits switching polarity between the first and second electrodes.

28. A recreational portable spa according to claim 21, wherein the spa has a capacity of from about 150 to about 700 gallons.

29. A recreational portable spa according to claim 21, wherein the first and second contact regions are each made of graphite.

30. A recreational portable spa according to claim 21, wherein:

the non-woven extruded graphite has an ash content equal to or less than 1.0 weight percent; and an aqueous specific resistivity equal to or less than 0.01 ohms/cm$^2$; and the spa has a capacity of from about 150 to about 700 gallons.

* * * * *